United States Patent
Ranjit et al.

(10) Patent No.: US 11,362,883 B1
(45) Date of Patent: Jun. 14, 2022

(54) LINK STATE TRACKING FOR VIRTUAL INTERFACES

(71) Applicant: Cisco Technology, Inc., San Jose, CA (US)

(72) Inventors: Dinesh Ranjit, San Jose, CA (US); Ramanathan Lakshmikanthan, Santa Clara, CA (US); Vijay Padmanabhan, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/200,259

(22) Filed: Mar. 12, 2021

Related U.S. Application Data

(63) Continuation of application No. 16/435,895, filed on Jun. 10, 2019, now Pat. No. 10,992,515.

(51) Int. Cl.
| | |
|---|---|
| *G06F 15/173* | (2006.01) |
| *H04L 41/06* | (2022.01) |
| *G06F 9/455* | (2018.01) |
| *H04L 49/00* | (2022.01) |

(52) U.S. Cl.
CPC .......... *H04L 41/06* (2013.01); *G06F 9/45558* (2013.01); *H04L 49/70* (2013.01); *G06F 2009/45595* (2013.01)

(58) Field of Classification Search
CPC ..... H04L 41/06; H04L 49/70; G06F 9/45558; G06F 2009/45595
USPC ....................................................... 709/223
See application file for complete search history.

(56) References Cited

U.S. PATENT DOCUMENTS

| | | | |
|---|---|---|---|
| 8,195,774 B2* | 6/2012 | Lambeth | H04L 29/12839 709/220 |
| 8,432,793 B2 | 4/2013 | Errickson et al. | |
| 8,726,093 B2* | 5/2014 | Droux | G06F 11/2005 714/43 |

(Continued)

FOREIGN PATENT DOCUMENTS

WO   2019001398 A1   1/2019

OTHER PUBLICATIONS

S. Jeong, J. You and J. W. Hong, "Design and Implementation of Virtual TAP for SDN-based OpenStack Networking," 2019 IFIP/IEEE Symposium on Integrated Network and Service Management (IM), 2019, pp. 233-241. (Year: 2019).*

(Continued)

*Primary Examiner* — Melvin H Pollack
(74) *Attorney, Agent, or Firm* — Edell, Shapiro & Finnan, LLC

(57) ABSTRACT

Presented herein are methodologies for tracking a link state of a physical network connection and selectively reporting the link state to virtual machines that rely on the physical network connection. A method includes receiving an indication, at a hypervisor, which is running on a host computer and which instantiates a virtual switch, that a physical link interconnecting the host computer to a network has failed; determining that the physical link serves the virtual switch; determining whether link state tracking is enabled for the physical link; and when link state tracking is enabled for the physical link, notifying a virtual machine, which is running on the host computer and which is being served by the virtual switch, that a connection between the virtual machine and the network has failed.

20 Claims, 9 Drawing Sheets

(56) References Cited

U.S. PATENT DOCUMENTS

| | | | |
|---|---|---|---|
| 8,953,441 | B2 | 2/2015 | Nakil et al. |
| 8,959,215 | B2 | 2/2015 | Koponen et al. |
| 8,966,035 | B2 | 2/2015 | Casado et al. |
| 9,106,442 | B2 | 8/2015 | Zhou et al. |
| 9,137,099 | B2 | 9/2015 | Hao |
| 9,344,336 | B2 | 5/2016 | Lee et al. |
| 9,426,095 | B2* | 8/2016 | Pandey ............... H04L 49/00 |
| 10,003,528 | B2 | 6/2018 | Srinivasan et al. |
| 10,091,138 | B2 | 10/2018 | Szabo et al. |
| 10,097,462 | B2 | 10/2018 | Sreeramoju |
| 10,110,472 | B2 | 10/2018 | Cevher |
| 10,129,180 | B2 | 11/2018 | Zhang et al. |
| 10,164,872 | B2 | 12/2018 | Saltsidis et al. |
| 10,171,302 | B2 | 1/2019 | Jiang et al. |
| 10,248,447 | B2 | 4/2019 | Leitner |
| 10,263,832 | B1* | 4/2019 | Ghosh ................ H04L 43/16 |
| 10,263,863 | B2 | 4/2019 | Mukerji et al. |
| 10,361,919 | B2 | 7/2019 | Yang et al. |
| 10,382,576 | B2 | 8/2019 | Austruy et al. |
| 10,404,573 | B2 | 9/2019 | Ammireddy et al. |
| 10,445,197 | B1 | 10/2019 | Harpreet |
| 10,476,698 | B2 | 11/2019 | Chikkamath et al. |
| 10,530,636 | B2 | 1/2020 | Ma |
| 10,536,355 | B1 | 1/2020 | Cao et al. |
| 10,560,525 | B2* | 2/2020 | Gopinath ............ H04L 43/10 |
| 10,581,726 | B2* | 3/2020 | Mirsky ................ H04L 45/741 |
| 10,656,960 | B2 | 5/2020 | Malboubi et al. |
| 10,659,393 | B2* | 5/2020 | Hsu ..................... H04L 41/12 |
| 10,728,090 | B2* | 7/2020 | Deshmukh ......... H04L 41/0668 |
| 10,757,020 | B2* | 8/2020 | Morris ................ H04L 45/50 |
| 10,819,833 | B2* | 10/2020 | D'Souza ............. H04L 45/586 |
| 10,892,942 | B2* | 1/2021 | Rangasamy ....... H04L 43/0817 |
| 10,924,329 | B2* | 2/2021 | Embarmannar Vijayan ................ H04L 43/065 |
| 10,992,538 | B2* | 4/2021 | Johnsen ............. H04L 45/586 |
| 10,992,568 | B2* | 4/2021 | Michael ............. H04L 43/08 |
| 11,050,652 | B2* | 6/2021 | Raindel ............. H04L 43/0817 |
| 11,070,394 | B2* | 7/2021 | Johnsen ............. H04L 12/462 |
| 11,099,873 | B2* | 8/2021 | Ellore Sreenath .. G06F 9/45558 |

| | | | |
|---|---|---|---|
| 2009/0207726 | A1 | 8/2009 | Thomson et al. |
| 2011/0093251 | A1* | 4/2011 | Belgaied ............. H04L 41/145 703/13 |
| 2018/0041380 | A1 | 2/2018 | Lin et al. |
| 2019/0007292 | A1 | 1/2019 | Nevo et al. |
| 2019/0250940 | A1 | 8/2019 | Seferidis et al. |
| 2019/0288905 | A1 | 9/2019 | Wang et al. |
| 2020/0007383 | A1* | 1/2020 | Efraim ............... H04L 41/0668 |
| 2020/0014615 | A1 | 1/2020 | Michael et al. |
| 2020/0106696 | A1* | 4/2020 | Michael ............. H04L 45/123 |
| 2020/0145313 | A1 | 5/2020 | Raindel et al. |
| 2020/0186460 | A1 | 6/2020 | Power et al. |
| 2020/0296026 | A1* | 9/2020 | Michael ............. H04L 43/08 |
| 2021/0044529 | A1* | 2/2021 | Salem ................ H04L 69/329 |

OTHER PUBLICATIONS

Yaozu Dong, Xiaowei Yang, Jianhui Li, Guangdeng Liao, Kun Tian, Haibing Guan, High performance network virtualization with SR-IOV, Journal of Parallel and Distributed Computing, vol. 72, Issue 11, 2012, pp. 1471-1480. (Year: 2012).*

Naga Katta, Aditi Ghag, Mukesh Hira, Isaac Keslassy, Aran Bergman, Changhoon Kim, and Jennifer Rexford. 2017. Clove: Congestion-Aware Load Balancing at the Virtual Edge. Proceedings of the 13th International Conference on emerging Networking Experiments and Technologies (CoNEXT '17). 323-335. (Year: 2017).*

A. Willig, M. Kubisch, C. Hoene and A. Wolisz, "Measurements of a wireless link in an industrial environment using an IEEE 802.11-compliant physical layer," in IEEE Transactions on Industrial Electronics, vol. 49, No. 6, pp. 1265-1282, Dec. 2002, doi: 10.1109/TIE.2002.804974. (Year: 2002).*

S. B. Furber et al., "Overview of the SpiNNaker System Architecture," in IEEE Transactions on Computers, vol. 62, No. 12, pp. 2454-2467, Dec. 2013, doi: 10.1109/TC.2012.142. (Year: 2013).*

Nagarajan, R., Qureshi, M.A., Ramanna, B., Hunt, C.J., Chandwani, R., Das, B. and Shrotriya, A. (2001), A fault-tolerant MPLS-based control and communication network for the Lucent LambdaRouter. Bell Labs Tech. J., 6: 153-169. (Year: 2001).*

* cited by examiner

| NIC / BOND | LINK STATE | LINK STATE TRACKING | ASSOCIATED VIRTUAL SWITCH | VMs HOSTED BY VIRTUAL SWITCH |
|---|---|---|---|---|
| 110 | UP | ENABLED | 140 | VM1, VM2 |
| 111 | UP | DISABLED | 141 | VM3 |
| 510 | UP | ENABLED | 140 | VM1, VM2 |

FIG.2

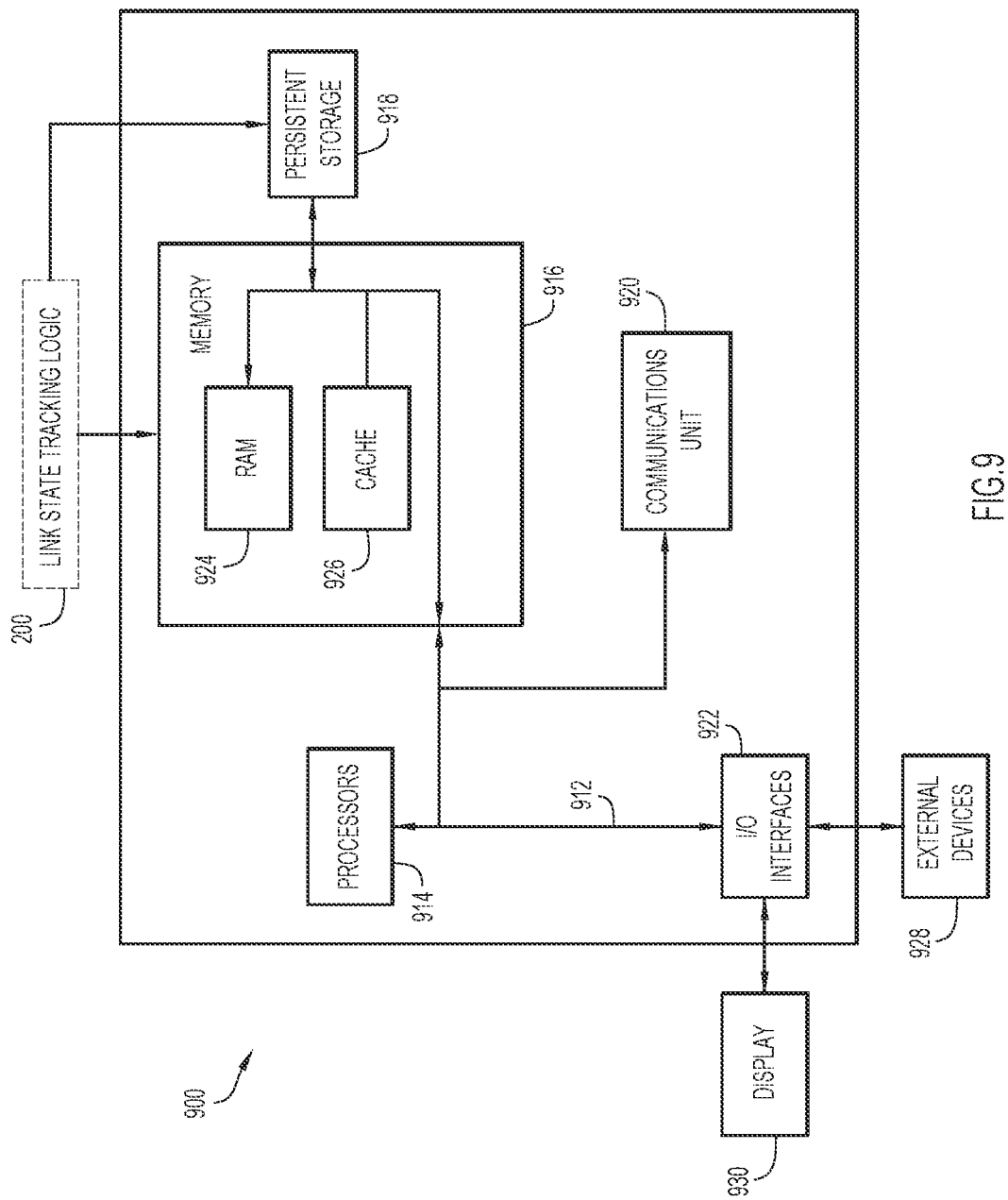

LINK STATE TRACKING FOR VIRTUAL INTERFACES

CROSS REFERENCE TO RELATED APPLICATIONS

This application is a continuation of U.S. application Ser. No. 16/435,895, filed Jun. 10, 2019, which is incorporated herein by reference in its entirety.

TECHNICAL FIELD

The present disclosure relates to virtual networking, and more particularly to tracking a link state of a physical network connection and selectively reporting the link state to virtual machines that rely on the physical network connection.

BACKGROUND

Network function virtualization is increasingly being adopted in Enterprise networks. There are various network virtualization technologies that may be used to allow sharing of physical network interfaces, and other resources, among multiple virtual network functions. In one such technology, virtual switches are instantiated in a hypervisor enabling virtual network interfaces and physical network interfaces to be represented as ports on the virtual switches, thus allowing the physical network resource to be shared across multiple virtual instances. However, unlike physical network functions in which a physical network interface link state is used by networking software to make networking decisions, network software in a virtual function may not be able to detect link state changes of the physical network interfaces.

BRIEF DESCRIPTION OF THE DRAWINGS

FIG. 2 depicts information collected and accessed by link state tracking logic in accordance with an example embodiment.

FIG. 9 depicts a device (e.g., a host computer) that might host and execute link state tracking logic in accordance with an example embodiment.

DESCRIPTION OF EXAMPLE EMBODIMENTS

Overview

Presented herein are methodologies for tracking a link state of a physical network connection and selectively reporting the link state to virtual machines that rely on the physical network connection. A method includes receiving an indication, at a hypervisor, which is running on a host computer and which instantiates a virtual switch, that a physical link interconnecting the host computer to a network has failed; determining that the physical link serves the virtual switch; determining whether link state tracking is enabled for the physical link; and when link state tracking is enabled for the physical link, notifying a virtual machine, which is running on the host computer and which is being served by the virtual switch, that a connection between the virtual machine and the network has failed.

A device or apparatus is also described. The device may include an interface unit configured to enable network communications, a memory, and one or more processors coupled to the interface unit and the memory, and configured to: receive an indication, at a hypervisor, which is running on the device and which instantiates a virtual switch, that a physical link interconnecting the device to a network has failed; determine that the physical link serves the virtual switch; determine whether link state tracking is enabled for the physical link; and when link state tracking is enabled for the physical link, notify a virtual machine, which is running on the device and which is being served by the virtual switch, that a connection between the virtual machine and the network has failed.

Example Embodiments

Figure 1:
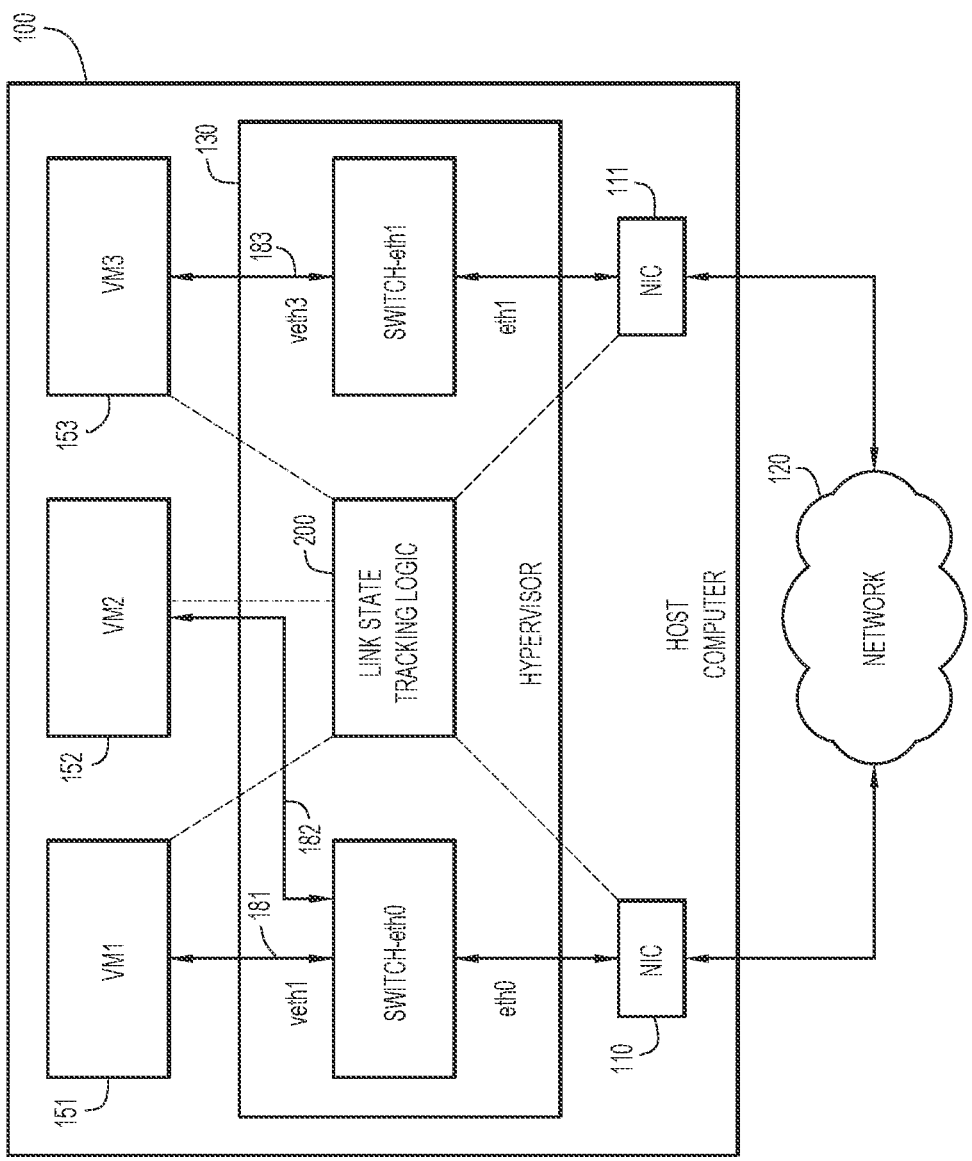
FIG. 1 depicts a host computer that includes physical network interfaces and runs a hypervisor, virtual switches, virtual machines, and link state tracking logic in accordance with an example embodiment.

FIG. 1 depicts a host computer that includes physical network interfaces and runs a hypervisor, virtual switches, virtual machines, and link state tracking logic in accordance with an example embodiment. As shown in FIG. 1, a host computer 100 (described more fully in connection with FIG. 9) includes physical network interface card (NIC) 110 and NIC 111. Computer 100 hosts a hypervisor 130 that enables network function virtualization. For example, hypervisor 130 may instantiate virtual switches (or bridges) switch 140, switch 141 that enable connectivity of virtual machines VM1 151, VM2, 152, VM3 153 to a network 120 via NICs 110, 111, as the case may be. In one example implementation, communication among, e.g., network 120, NIC 110, switch 140 and VM1 151, VM2 (and similarly with respect to NIC 111, switch 141 and VM3 153) may be in accordance with the Ethernet standard. As such, link 171 may be referred to as "eth0," and link 172 may be referred to as "eth1." Links 181, 182 and 183 are virtual links as they serve virtual machines 151, 151, 153 and thus may be referred to as "veth1," "veth2," and "veth3," respectively. Links 171, 172, 181, 182, and 183 may be considered to be part of the depicted topology's data plane.

Also shown in FIG. 1 is link state tracking logic 200. Link state tracking logic 200 may be in communication with NICs 110, 111 and virtual machines 151, 152, 153 via a separate control plane (but could also communicate in-band with the data plane). At a high level, link state tracking logic 200 is configured to receive an indication that a link (e.g., link 171) has failed or is down. Link state tracking logic 200 is further configured to determine that the link serves a given virtual switch (e.g., switch 140), and is still further configured to determine whether "link state tracking" is enabled for the link. When link state tracking is enabled for the link, link state tracking logic 200 is configured to notify one or more a virtual machines (e.g., VM1 151, VM2 152) that a connection between the virtual machine(s) and the network 120 has failed. In this way, a virtual machine will become aware that its link to an outside network is no longer operational. This may cause a given virtual machine to, e.g., cease operations, trigger a failover command, etc.

In order to achieve the above-mentioned notification functionality, link state tracking logic 200 maintains status information about the topology shown in FIG. 1, and configuration settings related thereto (collectively "status information"). More specifically, FIG. 2 depicts status information collected/accessed by link state tracking logic 200 in accordance with an example embodiment. In this example, the status information is arranged in a table (e.g., stored in memory) that includes, for each NIC and bond or aggregated group (discussed later), an indication of its link state (UP or DOWN (failed)), whether link state tracking is enabled or disabled for that link, which virtual switch is associated with each respective NIC, and which virtual machines are served by respective switches.

Thus, as one example, and referring also to FIG. 1, link 171, associated with NIC 110 is UP, link state tracking is enabled, NIC 110 is associated virtual switch is 140, and the virtual machines served by virtual switch 140 include VM1 151 and VM2 152.

Figure 3:
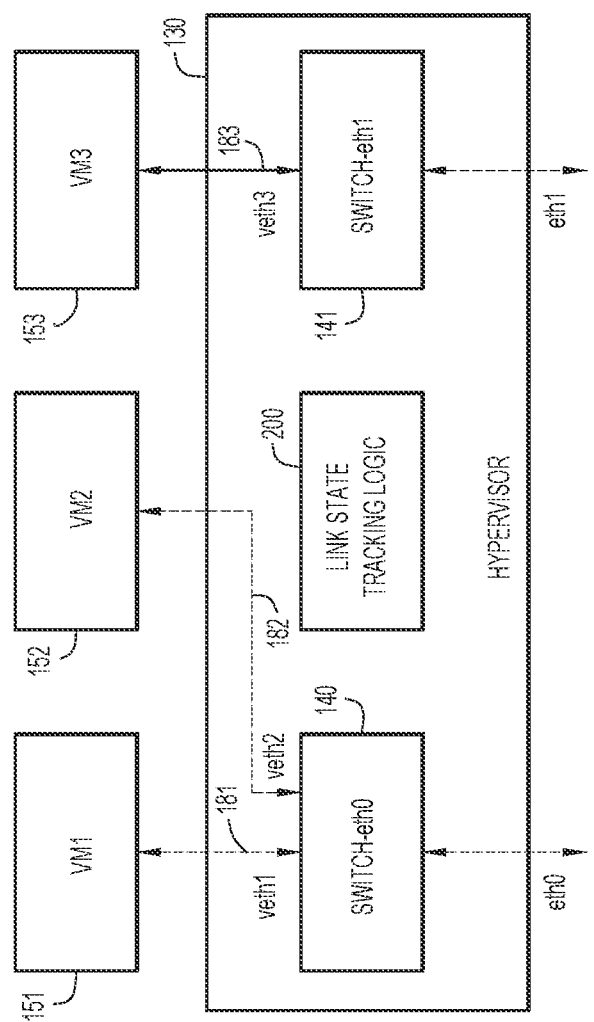
FIG. 3 depicts a scenario in which link state tracking is enabled for a first physical link and not enabled for a second physical link in accordance with an example embodiment.

FIG. 3 depicts a scenario in which link state tracking is enabled for a first physical link and not enabled for a second physical link in accordance with an example embodiment. Specifically, in FIG. 3, a state of link 171 is down or failed (indicated by a dashed line). In this scenario, link state tracking logic 200 determines from relevant status information that link 171 serves virtual switch 140, and that virtual machines VM1 151, VM2 152 are served by virtual switch 140. As such, link state tracking logic 200 notifies VM1 151, VM2 152 that their respective connections, namely links 181, 182, to network 120, have failed. Links 181, 182 are thus shown as failed, as well. In accordance with an embodiment, when link 171 come back up, link state tacking logic 200 will notify VM1 151, VM2 152 of such a state change. As such, when link state tacking is enabled, virtual links are toggled UP/DOWN consistent with a physical link with which the virtual links are associated.

In this same scenario of FIG. 3, link state tracking is not enabled for link 172. As such, even though link 172 is down (or failed), link state tracking logic 200 does not notify VM3 153. In such a scenario, it is possible that a network administrator might know that VM3 153 need not be connected to network 120, and thus knowing whether link 183 is available or not, is irrelevant. For example, although not shown, a fourth virtual machine may be interacting with VM3 153 via switch 141, but neither of that virtual machine nor VM3 153 relies on an external connection.

Figure 4:
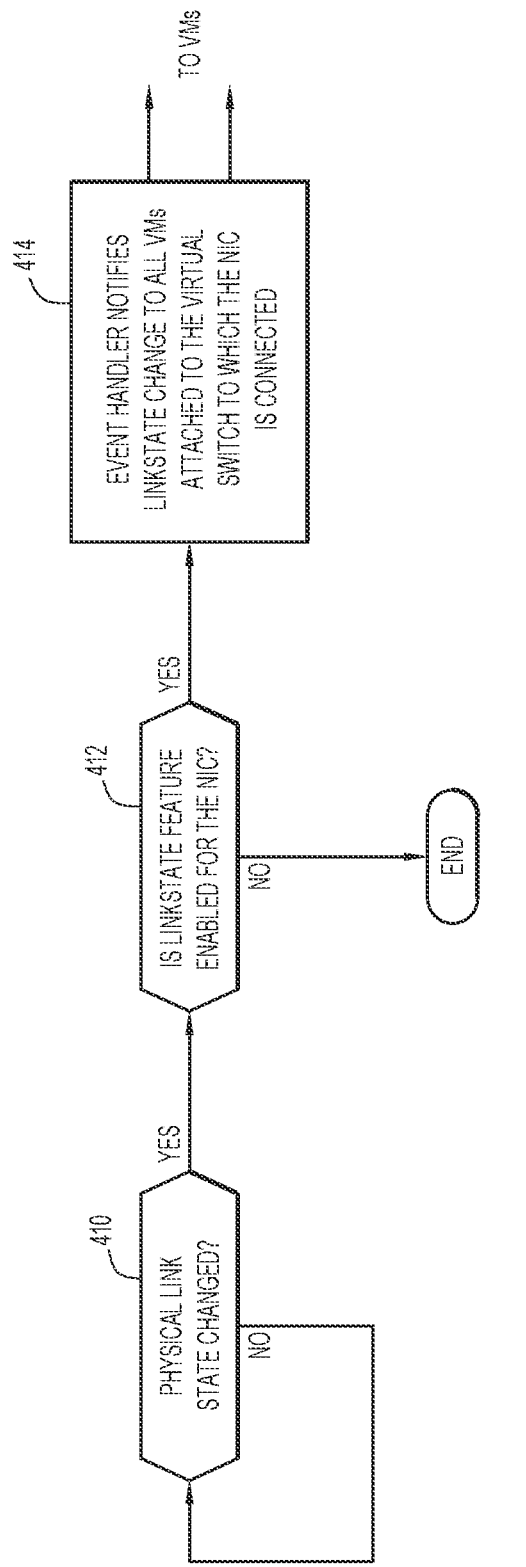
FIG. 4 is a flow chart illustrating a series of operations related to a single physical link state change in accordance with an example embodiment.

FIG. 4 is a flow chart illustrating a series of operations related to a single physical link state change in accordance with an example embodiment. The operations depicted in FIG. 4 may be performed by link state tracking logic 200. At 410, it is determined whether a physical link state has changed. In one possible implementation, a link state change may be delivered in the form of a mailbox event directed to the hypervisor 130. If there has been a link state change, then at 412, it is determined whether link state tracking is enabled for the given link that is being serviced by a given NIC. If no, then no further action is taken. If yes, then at 414, an event handler, for example, operating in hypervisor 130, notifies virtual machines attached to the virtual switch to which the given NIC is connected that a link state has changed.

Figure 5:
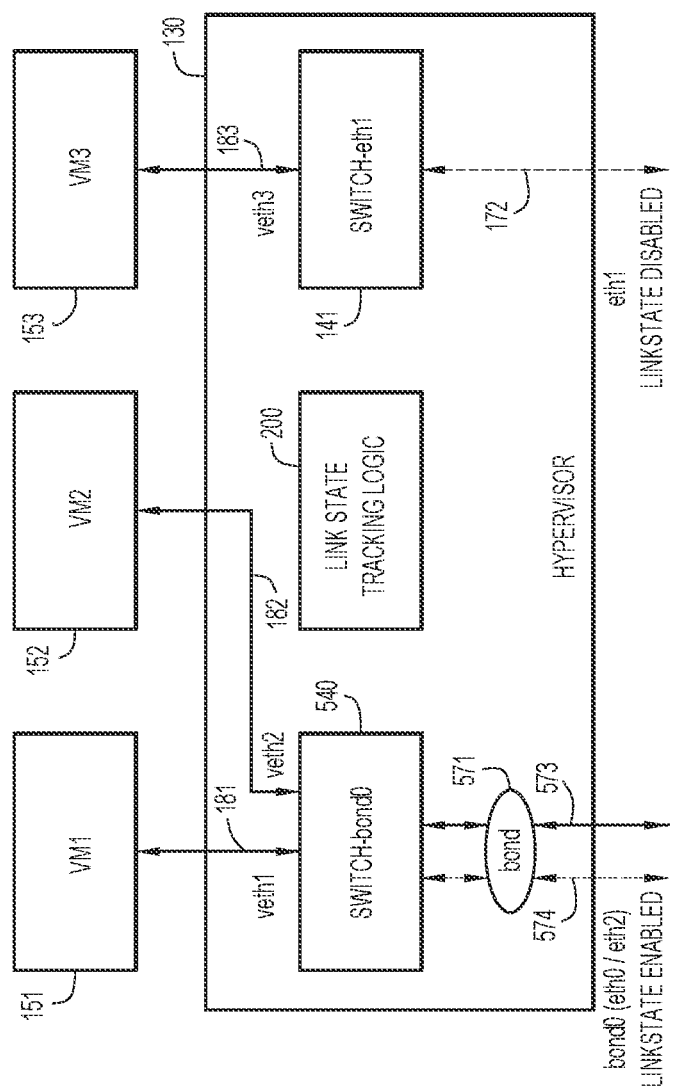
FIG. 5 depicts a scenario in which link state tracking is enabled for a first bonded, and up, physical link and not enabled for a second physical link in accordance with an example embodiment.

FIG. 5 depicts a scenario in which link state tracking is enabled for a first bonded, and UP, physical link, and not enabled for a second physical link in accordance with an example embodiment. Specifically, in FIG. 5, a state of a bonded or aggregated link 571 is UP since at least one of its constituent links 573 is UP, while another of its constituent links 574 is DOWN (indicated by the dashed line). As such the overall bond or aggregated link 571 is considered UP. In this scenario, link state tracking logic 200 determines from relevant status information that aggregated link 571 serves virtual switch 540, and that virtual machines VM1 151, VM2 152 are served by virtual switch 540. As such, link state tracking logic 200 notifies VM1 151, VM2 152 that their respective connections, namely links 181, 182, to network 120, are UP.

In this same scenario of FIG. 5, link state tracking is not enabled for link 172. As such, even though link 172 is DOWN (or failed), link state tracking logic 200 does not notify VM3 153. In such a scenario, it is possible that a network administrator might know that VM3 153 need not be connected to network 120, and thus knowing whether link 183 is available or not, is irrelevant.

Figure 6:
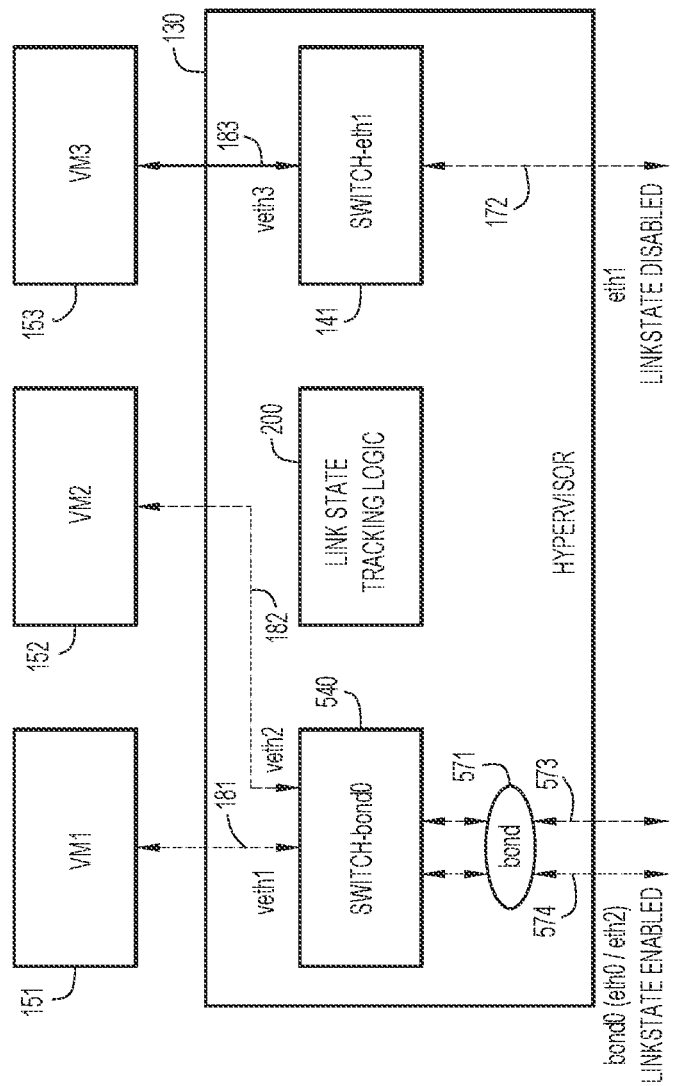
FIG. 6 depicts a scenario in which link state tracking is enabled for a first bonded, and down, physical link and not enabled for a second physical link in accordance with an example embodiment.

FIG. 6 depicts a scenario in which link state tracking is enabled for a first bonded, and failed, physical link and not enabled for a second physical link in accordance with an example embodiment. Specifically, in FIG. 6, a state of bonded or aggregated link 571 is DOWN or failed (indicated by the dashed line) since both of its constituent links 573, 574 are DOWN. In this scenario, link state tracking logic 200 determines from relevant status information that aggregated link 571 serves virtual switch 540, and that virtual machines VM1 151, VM2 152 are served by virtual switch 540. As such, link state tracking logic 200 notifies VM1 151, VM2 152 that their respective connections, namely links 181, 182, to network 120, have failed. Links 181, 182 are thus shown as failed, as well. When bonded or aggregated link 571 comes back UP, link state tacking logic 200 will notify VM1 151, VM2 152 of such a state change. As such, when link state tracking is enabled, virtual links are toggled UP/DOWN consistent with a physical bonded/aggregated link with which the virtual links are associated.

In this same scenario of FIG. 6, link state tracking is not enabled for link 172. As such, even though link 172 is DOWN (or failed), link state tracking logic 200 does not notify VM3 153. In such a scenario, it is possible that a network administrator might know that VM3 153 need not be connected to network 120, and thus knowing whether link 183 is available or not, is irrelevant.

Figure 7:
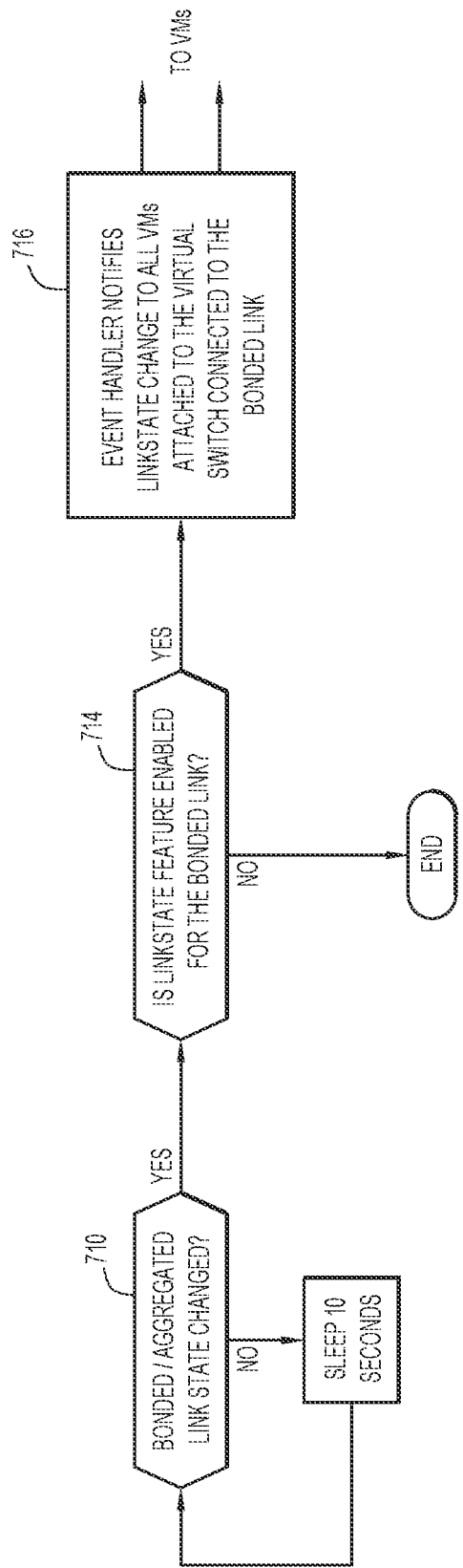
FIG. 7 is a flow chart illustrating a series of operations related to a bonded or aggregated physical link state change in accordance with an example embodiment.

FIG. 7 is a flow chart illustrating a series of operations related to an aggregated physical link state change in accordance with an example embodiment. The operations depicted in FIG. 7 may be performed by link state tracking logic 200. At 710, it is determined whether a bonded or aggregated physical link state has changed. An indication of a link state change may be delivered in the form of a mailbox event directed to the hypervisor 130. Alternatively, whether a bonded or aggregated link is UP or DOWN may be determined by polling a link aggregation control protocol (LACP) that maintains a status of aggregated links. Polling may occur, e.g., every 10 seconds, as indicated by 712. If, at 710, a bonded or aggregated link has changed state, then, at 714, it is determined whether link state tracking is enabled for the given bonded/aggregated link that is being serviced by a given NIC. If no, then no further action is taken. If yes, then at 716, an event handler, for example, operating in hypervisor 130, notifies virtual machines attached to the virtual switch to which the given NIC is connected that a link state has changed.

It is noted that a change in a link state may be from UP to DOWN, or from DOWN to UP, and either state change, when link state tracking is enabled, may be reported to virtual machines that may be impacted by such a state change.

Figure 8:
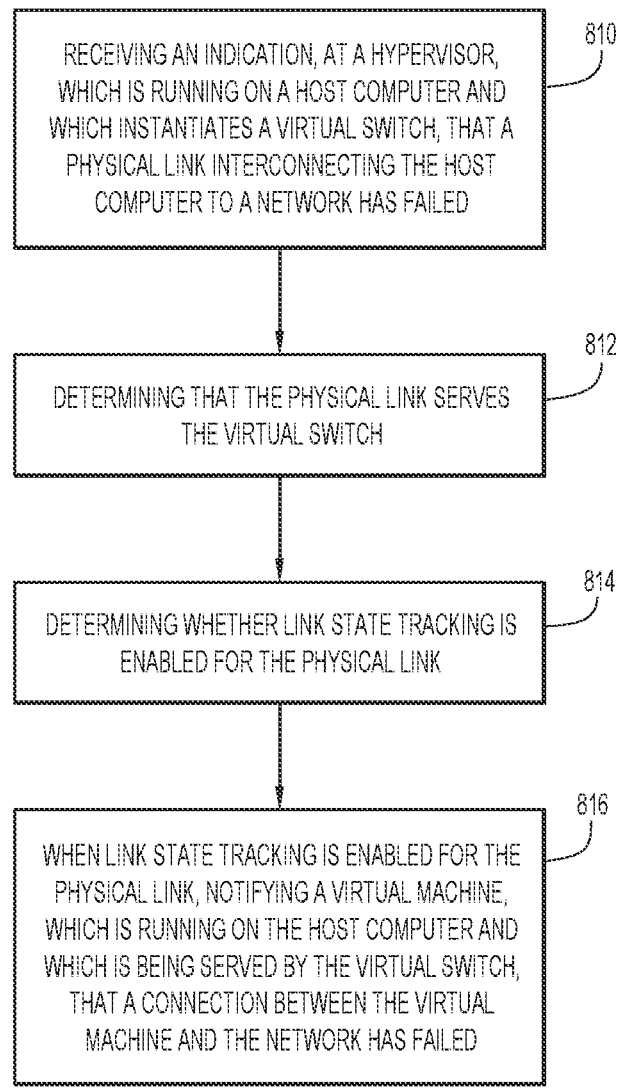
FIG. 8 is a flow chart illustrating a series of operations performed by link state tracking logic in accordance with an example embodiment.

FIG. 8 is a flow chart illustrating a series of operations performed by link state tracking logic in accordance with an example embodiment. At 810, an operation includes receiving an indication, at a hypervisor, which is running on a host computer and which instantiates a virtual switch, that a physical link interconnecting the host computer to a network has failed. At 812, an operation includes determining that the physical link serves the virtual switch. At 814, an operation includes determining whether link state tracking is enabled for the physical link. And, at 816, an operation includes, when link state tracking is enabled for the physical link, notifying a virtual machine, which is running on the host computer and which is being served by the virtual switch, that a connection between the virtual machine and the network has failed.

FIG. 9 depicts a device (e.g., a host computer) that might host and execute link state tracking logic 200 in accordance with an example embodiment. It should be appreciated that FIG. 9 provides only an illustration of one embodiment and does not imply any limitations with regard to the environments in which different embodiments may be implemented. Many modifications to the depicted environment may be made.

As depicted, the device 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media.

One or more programs (e.g., link state tracking logic 200) may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 914, cause the computing device 400 to perform the operations of, e.g., FIGS. 4, 7, and 8.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links.

I/O interface(s) 922 allows for input and output of data with other devices that may be connected to computer device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving an indication, at a hypervisor, which is running on a host computer and which instantiates a virtual switch, that a physical link interconnecting the host computer to a network has failed, determining that the physical link serves the virtual switch, determining whether link state tracking is enabled for the physical link, and when link state tracking is enabled for the physical link, notifying a virtual machine, which is running on the host computer and which is being served by the virtual switch, that a connection between the virtual machine and the network has failed.

In an embodiment, the indication may be is received from a physical network interface card hosted by the host computer, and may be in a form of a mailbox event triggered by the physical network interface card and directed to the hypervisor.

In an embodiment, the physical link is an aggregated link comprising multiple physical links.

The method may further include determining when all of the multiple physical links in the aggregated link have failed. When all of the multiple physical links in the aggregated link have failed, the method may further include receiving the indication, at the hypervisor, that the physical link interconnecting the host computer to a network has failed.

In an embodiment, determining when all of the multiple physical links in the aggregated link have failed may include monitoring a link aggregation control protocol to determine a state of the aggregated link.

In an embodiment, the virtual switch is a first virtual switch, and the hypervisor instantiates both the first virtual switch and a second virtual switch, wherein the first virtual switch is served by a first physical link and the second virtual switch is served by a second physical link, and link state tracking is enabled, independently, for the first physical link and the second physical link.

In an embodiment, link state tracking is enabled for the first physical link and link state tracking is not enabled for the second physical link, and when the first physical link fails notifying a first virtual machine, which is running on the host computer and which is being served by the first virtual switch, that a connection between the first virtual machine and the network has failed, and when the second physical link fails not notifying a second virtual machine, which is running on the host computer and which is being served by the second virtual switch, that a connection between the second virtual machine and the network has failed.

In an embodiment, link state tracking is enabled is configurable by a user.

In another form, a device may also be provided in accordance with an embodiment. The device may include an interface unit configured to enable network communications; a memory; and one or more processors coupled to the interface unit and the memory, and configured to receive an indication, at a hypervisor, which is running on the device and which instantiates a virtual switch, that a physical link interconnecting the device to a network has failed, determine that the physical link serves the virtual switch, determine whether link state tracking is enabled for the physical link, and when link state tracking is enabled for the physical link, notify a virtual machine, which is running on the device and which is being served by the virtual switch, that a connection between the virtual machine and the network has failed.

In an embodiment, the indication may be received from a physical network interface card hosted by the device.

In an embodiment, the indication may be in a form of a mailbox event triggered by the physical network interface card and directed to the hypervisor.

In an embodiment, the physical link may be an aggregated link comprising multiple physical links.

In an embodiment the one or more processors may be configured to determine when all of the multiple physical links in the aggregated link have failed.

In an embodiment the one or more processors may be configured to, when all of the multiple physical links in the aggregated link have failed, receive the indication, at the hypervisor, that the physical link interconnecting the device to a network has failed.

In an embodiment the one or more processors may be configured to determine when all of the multiple physical links in the aggregated link have failed by monitoring a link aggregation control protocol to determine a state of the aggregated link.

In still another form, a non-transitory computer readable storage media is provided that is encoded with instructions that, when executed by a processor, cause the processor to receive an indication, at a hypervisor, which is running on a host computer and which instantiates a virtual switch, that a physical link interconnecting the device to a network has failed, determine that the physical link serves the virtual switch, determine whether link state tracking is enabled for the physical link, and when link state tracking is enabled for the physical link, notify a virtual machine, which is running on the device and which is being served by the virtual switch, that a connection between the virtual machine and the network has failed.

In an embodiment, the indication may be received from a physical network interface card hosted by the host computer.

In an embodiment, the indication may be in a form of a mailbox event triggered by the physical network interface card and directed to the hypervisor The above description is intended by way of example only. Various modifications and structural changes may be made therein without departing from the scope of the concepts described herein and within the scope and range of equivalents of the claims.

What is claimed is:

1. A method comprising:
   receiving an indication, at a hypervisor, which is running on a host computer and which instantiates a virtual switch, that a physical link interconnecting the host computer to a network has failed;
   determining that the physical link serves the virtual switch; and
   notifying a virtual machine, which is running on the host computer and which is being served by the virtual switch, that a connection between the virtual machine and the network has failed,
   wherein the indication is received from a physical network interface card hosted by the host computer.

2. The method of claim 1, further comprising performing the notifying in response to determining that link state tacking is enabled for the physical link.

3. The method of claim 1, wherein the indication is in a form of a mailbox event triggered by the physical network interface card and directed to the hypervisor.

4. The method of claim 1, wherein the physical link is an aggregated link comprising multiple physical links.

5. The method of claim 4, further comprising determining when all of the multiple physical links in the aggregated link have failed.

6. The method of claim 5, further comprising, when all of the multiple physical links in the aggregated link have failed, receiving the indication, at the hypervisor, that the physical link interconnecting the host computer to a network has failed.

7. The method of claim 5, wherein determining when all of the multiple physical links in the aggregated link have failed comprises monitoring a link aggregation control protocol to determine a state of the aggregated link.

8. The method of claim 1, wherein the virtual switch is a first virtual switch, and the hypervisor instantiates both the first virtual switch and a second virtual switch, wherein the first virtual switch is served by a first physical link and the second virtual switch is served by a second physical link, and link state tracking is enabled, independently, for the first physical link and the second physical link.

9. The method of claim 8, wherein link state tracking is enabled for the first physical link and link state tracking is not enabled for the second physical link, and when the first physical link fails notifying a first virtual machine, which is running on the host computer and which is being served by the first virtual switch, that a connection between the first virtual machine and the network has failed, and
   when the second physical link fails not notifying a second virtual machine, which is running on the host computer and which is being served by the second virtual switch, that a connection between the second virtual machine and the network has failed.

10. The method of claim 1, wherein whether link state tracking is enabled is configurable by a user.

11. A device comprising:
   an interface unit configured to enable network communications;
   a memory; and
   one or more processors coupled to the interface unit and the memory, and configured to:
      receive an indication, at a hypervisor, which is running on the device and which instantiates a virtual switch, that a physical link interconnecting the device to a network has failed;
      determine that the physical link serves the virtual switch; and
      notify a virtual machine, which is running on the device and which is being served by the virtual switch, that a connection between the virtual machine and the network has failed,
   wherein the indication is received from a physical network interface card hosted by the device.

12. The device of claim 11, wherein the one or more processors are further configured to notify the virtual machine in response to determining that link state tacking is enabled for the physical link.

13. The device of claim 11, wherein the indication is in a form of a mailbox event triggered by the physical network interface card and directed to the hypervisor.

14. The device of claim 11, wherein the physical link is an aggregated link comprising multiple physical links.

15. The device of claim 14, wherein the one or more processors are further configured to determine when all of the multiple physical links in the aggregated link have failed.

16. The device of claim 15, wherein the one or more processors are further configured to, when all of the multiple physical links in the aggregated link have failed, receive the indication, at the hypervisor, that the physical link interconnecting the device to a network has failed.

17. The device of claim 15, wherein the one or more processors are further configured to determine when all of the multiple physical links in the aggregated link have failed by monitoring a link aggregation control protocol to determine a state of the aggregated link.

18. A non-transitory computer readable storage media encoded with instructions that, when executed by a processor, cause the processor to:
- receive an indication, at a hypervisor, which is running on a host computer and which instantiates a virtual switch, that a physical link interconnecting the host computer to a network has failed;
- determine that the physical link serves the virtual switch; and
- notify a virtual machine, which is running on the host computer and which is being served by the virtual switch, that a connection between the virtual machine and the network has failed,
- wherein the indication is received from a physical network interface card hosted by the host computer.

19. The non-transitory computer readable storage media of claim 18, wherein the instructions, when executed by a processor, cause the processor to notify the virtual machine in response to determining whether link state tracking is enabled for the physical link.

20. The non-transitory computer readable storage media of claim 18, wherein the indication is in a form of a mailbox event triggered by the physical network interface card and directed to the hypervisor.

* * * * *